Feb. 28, 1933.   J. A. BALDWIN   1,899,788
ANIMATED WIND TOY
Filed Nov. 10, 1932
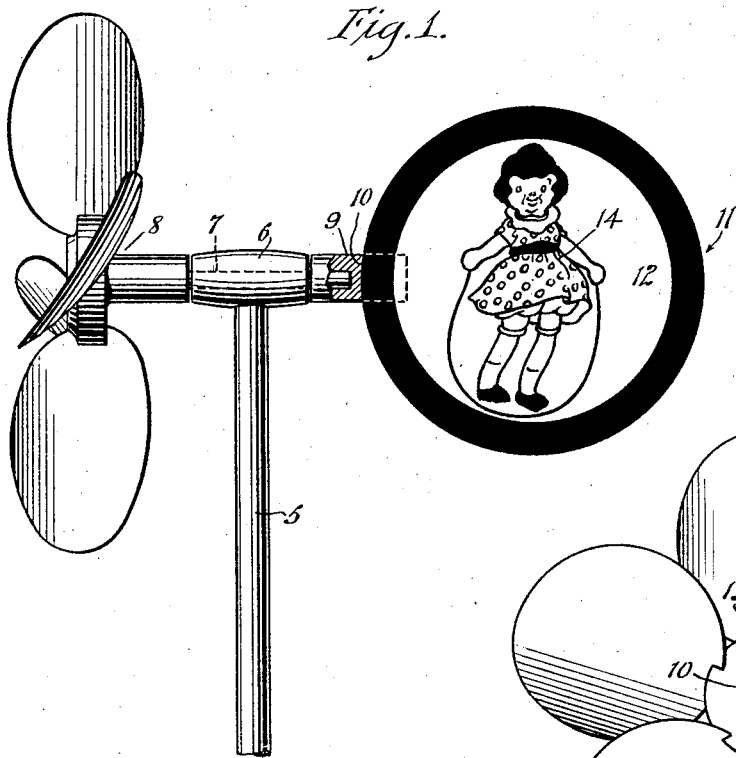
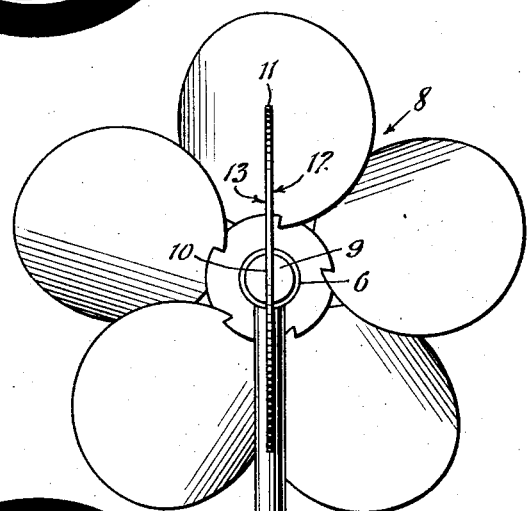
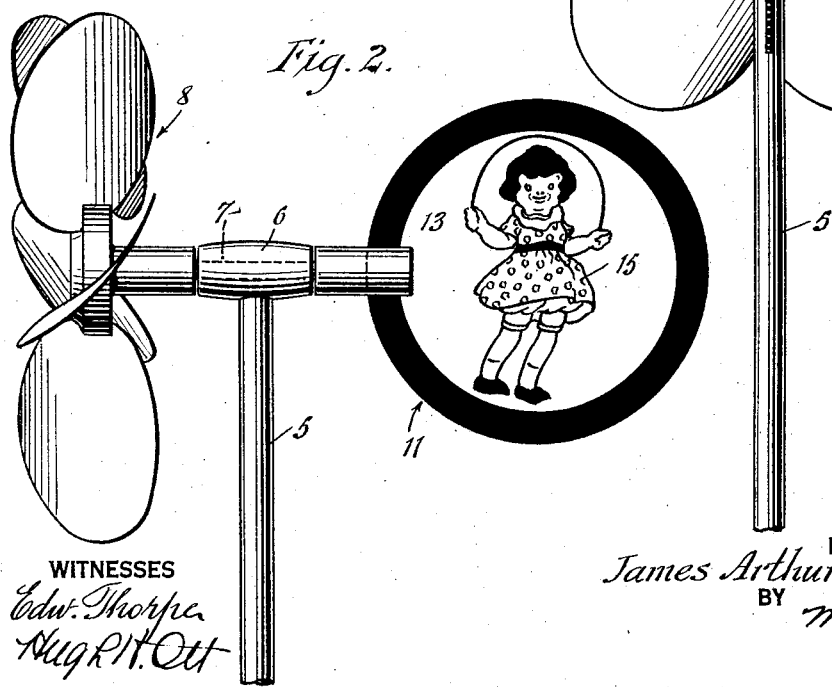
WITNESSES
INVENTOR
James Arthur Baldwin
BY
ATTORNEY Patented Feb. 28, 1933

1,899,788

UNITED STATES PATENT OFFICE

JAMES ARTHUR BALDWIN, OF LAWRENCE, MASSACHUSETTS

ANIMATED WIND TOY

Application filed November 10, 1932. Serial No. 642,096.

This invention relates generally to toys or juvenile amusement devices, although it may in some instances be employed as an advertising medium.

The invention broadly resides in the combination with a wind wheel or "pinwheel", of a panel to be turned by the wind wheel, which panel bears on its opposite faces pictorial representations of figures or other elements in two co-related positions, whereby upon rapid turning of the panel by the wind wheel, the figures on the opposite faces thereof are successively displayed to give the illusion of motion or animation or other desired equivalent results.

The invention further and more particularly comprehends a wind wheel mounted on one end of a rotary shaft, with means at the opposite end for supporting the panel with its faces extending in a plane substantially coinciding with the axis of the shaft.

The invention further embodies in a device of the indicated character, means for detachably supporting the panel from the rotary shaft to facilitate the interchanging of panels.

Other objects of the invention reside in the simplicity of construction of the device and the economy with which it may be produced.

With the above recited and other objects in view, reference is had to the following description and accompanying drawing, in which there is exhibited one example or embodiment of the invention, while the claims define the actual scope of the same.

In the drawing:

Figure 1 is a side view of a wind toy constructed in accordance with the invention and showing one face of the panel.

Figure 2 is a similar view showing the panel turned to expose the other face.

Figure 3 is a rear view of the toy.

Referring to the drawing by characters of reference, 5 designates a stick or handle which is formed at its upper end with a transverse bearing 6, in which is journaled for rotation a shaft 7 which has secured to one end thereof a wind wheel or pinwheel 8. The opposite end of the shaft 7 carries a head 9 which is secured thereto for turning movement with the shaft when the same is rotated by the wind wheel or pinwheel 8. The head 9 is preferably longitudinally slitted as at 10, inwardly from its outer end to receive and frictionally retain within the slitted portion thereof, a disk or other panel 11 which bears on its opposite faces 12 and 13 a pictorial representation of figures or other elements 14 and 15 in different positions, so that upon rapid rotation of the disk or panel the opposite faces thereof are successively displayed to give the illusion of motion or animation to the figures or any other equivalent result. As illustrated, the panel is disposed in a plane substantially coinciding with the axis of the shaft, but, obviously, within the scope of the invention, the panel may be otherwise mounted.

While there has been illustrated and described a preferred embodiment of the invention, variations and modifications which fall within the scope of the claims may be resorted to when desired.

What is claimed is:

1. A toy including a rotary shaft, a support therefor, a wind wheel at one end of the shaft and a panel at the opposite end of the shaft bearing on its opposite faces co-related pictorial representations adapted to be successively displayed upon rapid rotation of the shaft by the wind wheel, to give the effect of motion or animation to the pictorial representations.

2. A toy including a handle, a bearing on the handle, a shaft journaled in the bearing, a wind wheel at one end of the shaft, a slitted carrier at the opposite end of the shaft and a panel frictionally mounted in the slitted carrier and bearing on its opposite faces co-related differently posed pictures for successive display upon rapid rotation of the shaft, to give the illusion of motion to the pictures.

3. A toy including a handle, a bearing on the handle, a shaft journaled in the bearing, a wind wheel at one end of the shaft, a slitted carrier at the opposite end of the shaft and a panel frictionally mounted in the slitted carrier.

JAMES ARTHUR BALDWIN.